(12) United States Patent
Hood et al.

(10) Patent No.: US 7,550,874 B2
(45) Date of Patent: Jun. 23, 2009

(54) SYSTEM AND METHOD FOR A POWER SUPPLY DEVICE

(75) Inventors: Rush Winslow Hood, Tampa, FL (US); Charles Edmund Murphy, Sarasota, FL (US)

(73) Assignee: General Electric Company, Schenectady, NY (US)

( * ) Notice: Subject to any disclaimer, the term of this patent is extended or adjusted under 35 U.S.C. 154(b) by 169 days.

(21) Appl. No.: 11/758,058

(22) Filed: Jun. 5, 2007

(65) Prior Publication Data

US 2008/0303346 A1     Dec. 11, 2008

(51) Int. Cl.
*H02J 9/00* (2006.01)
*H02H 3/00* (2006.01)
*G08B 21/00* (2006.01)

(52) U.S. Cl. .................. 307/65; 307/126; 340/635; 340/636.1; 340/663

(58) Field of Classification Search ............ 307/80, 307/126, 65, 116; 340/635, 636.1, 636.15, 340/663, 642, 661

See application file for complete search history.

(56) References Cited

U.S. PATENT DOCUMENTS

| 5,483,165 | A | | 1/1996 | Cameron et al. |
| 5,770,897 | A | * | 6/1998 | Bapat et al. ............ 307/127 |
| 5,796,175 | A | * | 8/1998 | Itoh et al. ............ 307/10.1 |
| 5,983,137 | A | | 11/1999 | Yerkovich |
| 6,304,779 | B1 | | 10/2001 | Yerkovich |
| 7,388,349 | B2 | * | 6/2008 | Elder et al. ............ 320/104 |

* cited by examiner

*Primary Examiner*—Albert W Paladini
*Assistant Examiner*—Michael Rutland Wallis

(57) ABSTRACT

A power supply apparatus is disclosed herein. The power supply apparatus includes a power output, a first power source selectively connectable to the power output, and a second power source selectively connectable to the power output. A switch is configured to couple the first power source with the power output until the first power source becomes substantially depleted. The switch is also configured to couple the second power source with the power output after the first power source becomes substantially depleted. An indicator is configured to precisely convey the amount of power remaining in the power supply apparatus after the first power source becomes substantially depleted.

16 Claims, 1 Drawing Sheet

SYSTEM AND METHOD FOR A POWER SUPPLY DEVICE

FIELD OF THE INVENTION

This disclosure relates generally to a system and method for a power supply device.

BACKGROUND OF THE INVENTION

Battery systems are implemented as a power source for a wide variety of different applications. One problem is that it is difficult to accurately estimate the amount of energy remaining in a partially depleted battery. Therefore, conventional battery systems may become depleted with insufficient warning.

One known method for estimating battery life involves monitoring battery output voltage. A problem with this method is that many batteries have a voltage output curve that remains fairly flat during discharge until the battery is very close to depletion. Another problem with this method is that variables such as current load, battery age, and battery temperature can impact voltage output such that a battery life estimate based on voltage output may be imprecise.

Another known method for estimating battery life involves a technique referred to as Coulomb counting. A problem with Coulomb counting is that the battery must be periodically fully charged in order to provide a known full condition that is implemented as a reference. If the battery is not fully charged at a sufficiently frequent interval, the Coulomb counting technique can become imprecise.

BRIEF DESCRIPTION OF THE INVENTION

The above-mentioned shortcomings, disadvantages and problems are addressed herein which will be understood by reading and understanding the following specification.

In an embodiment, a power supply apparatus includes a power output, a first power source selectively connectable to the power output, and a second power source selectively connectable to the power output. The power supply apparatus also includes a switch connected to the power output. The switch is configured to couple the first power source with the power output until the first power source becomes substantially depleted. The switch is also configured to couple the second power source with the power output after the first power source becomes substantially depleted. The power supply apparatus also includes an indicator connected to the first power source. The indicator is configured to precisely convey the amount of power remaining in the power supply apparatus after the first power source becomes substantially depleted.

In another embodiment, a battery system includes a power output, a first battery selectively connectable to the power output, and a second battery selectively connectable to the power output. The battery system also includes a switch connected to the power output. The switch is configured to couple the first battery with the power output until the first battery becomes substantially depleted. The switch is also configured to couple the second battery with the power output after the first battery becomes substantially depleted. The battery system also includes a controller connected to the switch. The controller is configured to automatically operate the switch. The battery system also includes an indicator connected to the first battery. The indicator is configured to precisely convey the amount of power remaining in the battery system after the first battery becomes substantially depleted.

In another embodiment, a method for supplying power includes providing a power output, automatically transferring power from a first power source to the power output until the first power source becomes substantially depleted, automatically transferring power from a second power source to the power output after the first power source becomes substantially depleted, and providing a warning after the first power source becomes substantially depleted.

Various other features, objects, and advantages of the invention will be made apparent to those skilled in the art from the accompanying drawings and detailed description thereof.

DETAILED DESCRIPTION OF THE INVENTION

Figure 1:
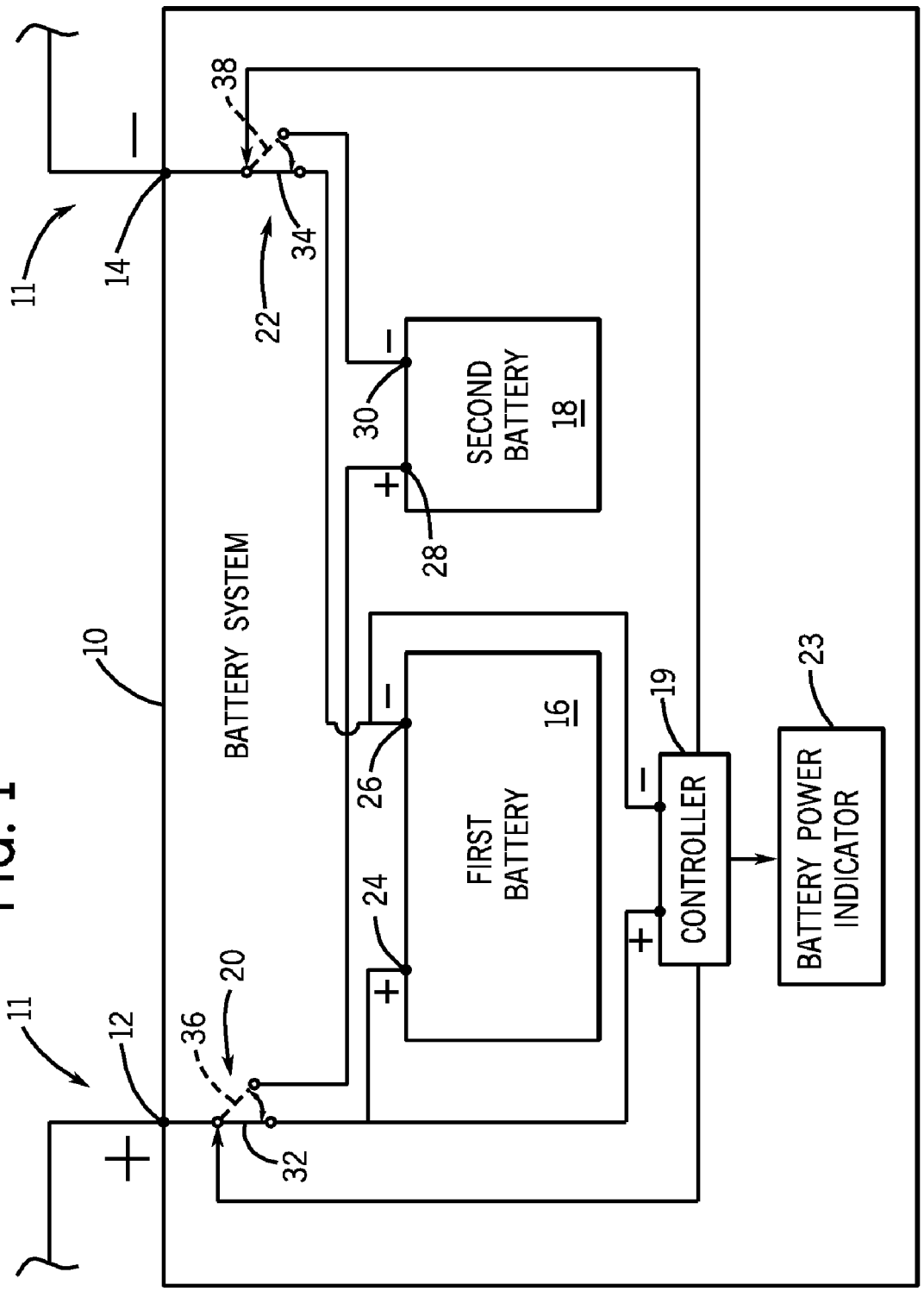
FIG. 1 is a schematic diagram illustrating a battery system in accordance with an embodiment.

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken as limiting the scope of the invention.

Referring to FIG. 1, a power supply 10 is schematically depicted in accordance with one embodiment. The power supply 10 will hereinafter be described as a battery system 10 for illustrative purposes. It should, however, be appreciated that the power supply 10 may alternatively include other power source devices such as, for example, a capacitor (not shown). Additionally, the batteries system 10 will be described as including a plurality of direct current (DC) batteries in accordance with an embodiment, however alternating current (AC) power sources may also be implemented.

The battery system 10 includes a power output 11 adapted for connection with a variety of different devices in order to transfer energy thereto in a known manner. According to one embodiment, the power output 11 includes a positive terminal 12 and a negative terminal 14. As will be described in detail hereinafter, when a predetermined level of depletion is reached, the battery system 10 is configured to precisely indicate the amount of remaining power.

According to one embodiment, the battery system 10 includes a first battery 16, a second battery 18, a controller 19, a first switch 20, a second switch 22, and a battery power indicator 23. The term "switch" as used herein is defined to include any device configured to selectively form an electrical connection between two or more components.

The first battery 16 includes a positive terminal 24 and a negative terminal 26. The second battery 18 includes a positive terminal 28 and a negative terminal 30. According to one embodiment, the first battery 16 has a larger storage capacity than the second battery 18, and the second battery 18 is adapted to function as a reserve or back-up power supply. According to another embodiment, the first battery 16 and the second battery 18 are pre-existing, off the shelf components, and are therefore potentially less expensive than specialized batteries designed specifically for a given application.

The controller 19 is operatively connected to the first switch 20 and the second switch 22. The controller 19 is operable to select between a primary position and a secondary position for each of the first switch 20 and the second switch 22. The primary position for the switches 20, 22 is schematically represented by the solid lines 32, 34, respectively. The secondary position for the switches 20, 22 is schematically represented by the dashed lines 36, 38, respectively. The battery system 10 draws power from the first battery 16 when the switches 20, 22 are respectively in the primary positions 32, 34, and the battery system 10 draws power from the second battery 18 when the switches 20, 22 are respectively in the secondary positions 36, 38. Therefore, the controller 19 can select one of the batteries 16, 18 to power the battery system 10 at any given time by controlling the position of the switches 20, 22. Advantageously, the controller 19 can automatically perform the battery selection process thereby eliminating the time and labor requirements otherwise necessary for a manual battery selection process.

According to one embodiment, the controller 19 maintains the switches 20, 22 in the primary positions 32, 34 until the first battery 16 is generally depleted, and thereafter the controller 19 transfers the switches 20, 22 into the second positions 36, 38. Therefore, according to this embodiment, the first battery 16 is implemented to power the battery system 10 until the first battery 16 is discharged, and thereafter the second battery 18 powers the battery system 10 until the second battery 18 is discharged.

The controller 19 is operatively connected to the positive terminal 24 and the negative terminal 26 of the first battery 16 and can thereby monitor output voltage in a known manner. According to one embodiment, the controller 19 can monitor the output voltage of the first battery 16 in order to identify depletion, and can thereafter implement the second battery 18 to power the battery system 10. In a non-limiting manner, the depletion of the first battery 16 can be indicated when the first battery's output voltage drops below a predefined limit, or when the slope of a battery output voltage curve falls outside a predefined range.

According to one embodiment, the first switch 20 is configured to selectively couple one of the positive terminals 24, 28 with the positive terminal 12, and the second switch 22 is configured to selectively couple one of the negative terminals 26, 30 with the negative terminal 14. The operation of the first and second switches 20, 22 is preferably coordinated (e.g., by the controller 19) in order to couple only one of the batteries 16, 18 with the terminals 12, 14 at a given time such that the battery system 10 only draws power from one of the batteries 16, 18 at a time. Advantageously, this embodiment de-couples the second battery 18 from the battery system 10 when the second battery 18 is not in use. In this manner, the second battery 18 is not discharged while the first battery 16 is operational so that the energy of the second battery 18 is conserved. According to another embodiment, the first switch 20 is configured to selectively couple one of the positive terminals 24, 28 with the positive terminal 12, and the negative terminals 26, 30 are each connected to ground such that the second switch 22 is not implemented.

As previously indicated, the battery system 10 is powered exclusively by the second battery 18 after the first battery 16 is depleted. This feature simplifies the process of estimating battery system 10 power at the time period immediately after the first battery 16 becomes depleted. More precisely, the amount of power remaining in the battery system 10 immediately after the first battery 16 becomes depleted is generally equivalent to the full storage capacity of the second battery 18.

The battery power indicator 23 is operatively connected to the controller 19. According to one embodiment, the controller 19 prompts the battery power indicator 23 to provide a warning that the battery power of the battery system 10 is low after the first battery 16 has become depleted. According to another embodiment, the controller 19 prompts the battery power indicator 23 to convey the precise amount of power remaining in the battery system 10 after the first battery 16 has become depleted. In a non-limiting manner, the battery power indicator 23 may include a warning light configured to indicate low power, or a monitor configured to display alphanumeric characters describing the precise amount or power remaining.

While the invention has been described with reference to preferred embodiments, those skilled in the art will appreciate that certain substitutions, alterations and omissions may be made to the embodiments without departing from the spirit of the invention. Accordingly, the foregoing description is meant to be exemplary only, and should not limit the scope of the invention as set forth in the following claims.

We claim:
1. A power supply apparatus comprising:
 a power output;
 a first power source selectively connectable to the power output;
 a second power source selectively connectable to the power output;
 a switch connected to one of the first power source and the second power source, said switch being configured to couple the first power source with the power output until the first power source becomes substantially depleted, said switch further being configured to couple the second power source with the power output after the first power source becomes substantially depleted;
 a controller configured to identify substantial depletion of the first power source, and to precisely estimate the amount of power remaining in the power supply apparatus immediately after the identified substantial depletion of the first battery based on the full storage capacity of the second power source; and
 an indicator connected to the controller, said indicator being configured to convey the amount of power remaining in the power supply apparatus immediately after the identified substantial depletion of the first battery based on input from the controller.

2. The power supply apparatus of claim 1, wherein said power output includes a positive terminal and a negative terminal.

3. The power supply apparatus of claim 1, wherein one of said first power source and said second power source includes a battery.

4. The power supply apparatus of claim 1, wherein one of said first power source and said second power source includes a capacitor.

5. The power supply apparatus of claim 1, wherein said switch includes a first switch and a second switch.

6. The power supply apparatus of claim 1, wherein said indicator includes a warning light.

7. The power supply apparatus of claim 1, wherein said indicator includes a monitor configured to display alphanumeric characters.

8. The power supply apparatus of claim 1, wherein said controller is configured to automatically operate the switch.

9. A battery system comprising:
 a power output;
 a first battery selectively connectable to the power output;
 a second battery selectively connectable to the power output;

a switch connected to the power output, said switch being configured to couple the first battery with the power output until the first battery becomes substantially depleted, said switch further being configured to couple the second battery with the power output after the first battery becomes substantially depleted;

an indicator; and a controller connected to the switch, the first battery and the indicator, said controller configured to:

automatically operate the switch;

identify substantial depletion of the first power source;

precisely estimate the amount of power remaining in the power supply apparatus immediately after the identified substantial depletion of the first battery based on the full storage capacity of the second power source; and prompt the indicator to convey the amount of power remaining in the power supply apparatus immediately after the identified substantial depletion of the first battery.

10. The battery system of claim 9, wherein said power output includes a positive terminal and a negative terminal.

11. The battery system of claim 10, wherein said switch includes a first switch and a second switch.

12. The battery system of claim 10, wherein said indicator includes a warning light.

13. The battery system of claim 10, wherein said indicator includes a monitor configured to display alphanumeric characters.

14. A method for supplying power;

providing a power supply apparatus comprising a power output, a first power source selectively connectable to the power output, and a second power source selectively connectable to the power output;

automatically transferring power from a the first power source to the power output until the first power source becomes substantially depleted;

automatically transferring power from a the second power source to the power output after the first power source becomes substantially depleted;

estimating the amount of power remaining in the power supply apparatus immediately after the substantial depletion of the first power source based on the full storage capacity of the second power source; and providing a warning immediately after the substantial depletion of the first power source.

15. The method of claim 14, further comprising providing a controller adapted to regulate the transfer of power from the first power source and the second power source.

16. The method of claim 14, further comprising providing a switch adapted to selectively couple the power output with one of the first power source and the second power source.

* * * * *